(12) United States Patent
Lee et al.

(10) Patent No.: US 6,376,638 B1
(45) Date of Patent: Apr. 23, 2002

(54) LATENT CURING AGENT FOR EPOXY RESIN INITIATED BY HEAT AND UV-LIGHT AND EPOXY RESIN COMPOSITION CONTAINING THE SAME AND CURED EPOXY PRODUCTS

(75) Inventors: Jae-Rock Lee; Soo-Jin Park; Geun Ho Kwak, all of Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/430,368

(22) Filed: Oct. 28, 1999

(30) Foreign Application Priority Data

Oct. 28, 1998 (KR) .............................. 98-46525

(51) Int. Cl.$^7$ .............................. C08F 2/48; C08F 2/50; C08G 59/68
(52) U.S. Cl. ................... 528/94; 252/182.15; 522/26; 522/63; 522/170; 523/429; 525/523
(58) Field of Search ...................... 528/94; 523/429; 525/523; 522/26, 100, 63, 170; 252/182.15; 544/405

(56) References Cited

U.S. PATENT DOCUMENTS

| | | | | |
|---|---|---|---|---|
| 3,294,865 A | * | 12/1966 | Price ........................ | 528/94 X |
| 3,879,312 A | | 4/1975 | Udding et al. | |
| 4,069,055 A | | 1/1978 | Crivello | |
| 4,246,298 A | * | 1/1981 | Guarnery et al. ....... | 522/100 X |
| 4,393,185 A | * | 7/1983 | Berner et al. ............. | 528/94 X |
| 4,694,029 A | * | 9/1987 | Land ........................ | 522/26 X |
| RE32,628 E | | 3/1988 | Tesch et al. ................ | 523/400 |
| 4,756,787 A | | 7/1988 | Drain et al. ................ | 156/310 |
| 4,962,162 A | * | 10/1990 | Kosuda et al. .......... | 525/523 X |
| 5,070,161 A | | 12/1991 | Nakano et al. ............. | 526/193 |
| 5,169,473 A | * | 12/1992 | Bertram et al. ......... | 525/523 X |
| 5,317,068 A | | 5/1994 | Watanabe et al. ........... | 525/526 |
| 5,459,266 A | * | 10/1995 | Kvakovszky et al. ... | 544/405 X |
| 5,541,000 A | * | 7/1996 | Hardy et al. .............. | 528/94 X |
| 6,034,200 A | * | 3/2000 | Lee et al. .................... | 528/94 |
| 6,121,405 A | | 9/2000 | Lee et al. .................... | 528/92 |
| 6,133,383 A | | 10/2000 | Lee et al. ................... | 525/504 |

FOREIGN PATENT DOCUMENTS

| | | | | |
|---|---|---|---|---|
| JP | 406228414 | * | 8/1994 | ................. 523/429 |
| JP | 06-321915 | | 11/1994 | |

OTHER PUBLICATIONS

Y.C. Kim et al.: "Effects of N–Benzylpyrazinium Hexafluoroantimonate on Rheological Properties in Cationic Epoxy Cure System", *Polymer Journal*, vol. 29, No. 9, pp. 759–765, Mar. 17, 1997.*

Kim, Y.C., et al., "Effects of N–Benzylpyrazinium Hexafluoroantimonate Concentration on Rheological Properties in Cationic Epoxy Cure System," *Polymer Journal*, vol. 29, No. 9 (Mar. 17, 1997) pp. 759–765.

Doyle, C.D., "Estimating Thermal Stability of Experimental Polymers by Empiricl Thermogravimetric Analysis," *Analytical Chemistry*, vol. 33, No. 1 (Jan. 1961) pp. 77–79.

English language translation of Korean Patent Application No. 1996–49371, which was filed on Oct. 29, 1996; published on Apr.29, 1998; and entitled "Method for Preparing a High Heat Resistant Epoxy Resin Composition Comprising Quinoxalinium Salt Containing Benzyl Group" (21 total pages, including 3 pages of cover sheets).

English language translation of Korean Patent Application No. 1996–51719, which was filed on Oct. 30, 1996; published on Apr. 30, 1998; and entitled "Method for Preparing a High Heat Resistant Epoxy Resin Composition Comprising Pyrazinium Salt Containing Benzyl Group" (18 total pages, including 3 pages of cover sheets).

U.S. application No. 08/959,401, Lee et al., filed Oct. 28, 1997.

U.S. application No. 08/959,889, Lee et al., filed Oct. 29, 1997.

* cited by examiner

*Primary Examiner*—Richard D. Lovering
(74) *Attorney, Agent, or Firm*—Ladas & Parry

(57) ABSTRACT

The present invention relates to a novel latent curing agent which is capable of controlling the initiation reaction stage and is curable by heat and/or UV-light, an epoxy resin composition containing it, and a mixed epoxy composition (blend) having different functional groups. Particularly, it has been found that the epoxy resin composition consisting of an aliphatic type epoxy (CAE) and/or a difunctional bisphenol A type epoxy (DGEBA) has excellent mechanical properties.

31 Claims, 8 Drawing Sheets

LATENT CURING AGENT FOR EPOXY RESIN INITIATED BY HEAT AND UV-LIGHT AND EPOXY RESIN COMPOSITION CONTAINING THE SAME AND CURED EPOXY PRODUCTS

BACKGROUND OF THE INVENTION

1. Field of Invention

The present invention relates to a novel latent curing agent which reacts to heat and/or UV-light, an epoxy composition containing it, a mixed epoxy composition (blend) having different functional groups and improved mechanical properties, and cured epoxy products.

2. Background of Invention

The conventional epoxy curing systems adopted either amine-type curing agents which exhibit low heat resistance and are harmful to both the human body and the environment or anhydride-type curing agents which in order to be cured, require both large amounts of curing agents and a long time and also react with lower rates of efficiency. Such conventional epoxy curing systems result in high production costs, a deterioration of physical properties and contribute to environmental pollution problems. At present, leaders of advanced electric, electronic and automobile industries require the development of latent curing agents in order to firstly, avoid the problems of amine-type or anhydride-type curing agents, and secondly, to induce curing reaction at a relatively low temperature around 100° C. within a time of between 30 and 120 minutes respectively and thirdly, to keep a storage period of more than six months whilst in a mixed state. The latent curing agents are specifically designed materials in order to allow the curing reaction initiated by heat, light, moisture or pressure, and are thus characterized by exhibiting control over the initiation stage.

Examples of typical latent curing agents in the cationic polymerization of epoxy resin include aromatic onium salts, which contain non-nucleophilic anions such as $PF_6^-$, $SbF_6^-$, $AsF_6^-$ and $BF_4^-$. However, certain problem with such aromatic onium salts containing non-nucleophilic anions used before now include a limitation in their solvent selectivity and also a large shrinkage after curing reaction and toxicity when they are used as latent initiators for epoxy resins.

Furthermore, the conventional epoxy resins exhibit relatively low heat and oxidation resistance properties in comparison to other high heat resistant resins, regardless of either their good electric insulating properties, processability, chemical resistance or mechanical strength. It is for these reasons that the applicability of such conventional epoxy resins has been restricted.

SUMMARY OF THE INVENTION

It is, therefore, an objective of the present invention to develop a curing agent, which possesses the following advantages:

the curing agent is able to overcome the associated problems of conventional amine-type or anhydride-type curing agents including high production costs, the deterioration of physical properties, the contribution to environmental pollution, and the long curing time required for the curing of epoxy resins;

the curing agent possesses latency properties capable of initiating a curing reaction not only by heat but also by light, such as UV-light, when used in small amounts under the correct reaction conditions;

the curing agent can accelerate a curing reaction both at a relatively low temperature of approximately 100° C. and also within a short time frame; and the curing agent has a storage period of more than several months whilst in a mixed state.

Another objective of the present invention is to provide an epoxy resin composition with significantly improved physical properties in comparison to the conventional epoxy resins, by the blending of epoxy resins containing different functional groups.

A further objective of the present invention is to allow the manufacture of cured epoxy products by means of heat or UV-light or both heat and UV-light.

The other objectives and features of the present invention will become apparent to those skilled in the art on review of the following detailed description. It should be understood, however, that the detailed description and specific examples, whilst indicating preferred embodiments of the present invention, are given by way of illustration and not limitation. Many changes and modifications within the scope of the present invention may be made without departing from the spirit thereof, and the invention includes all such modifications.

DETAILED DESCRIPTION

Figure 1:
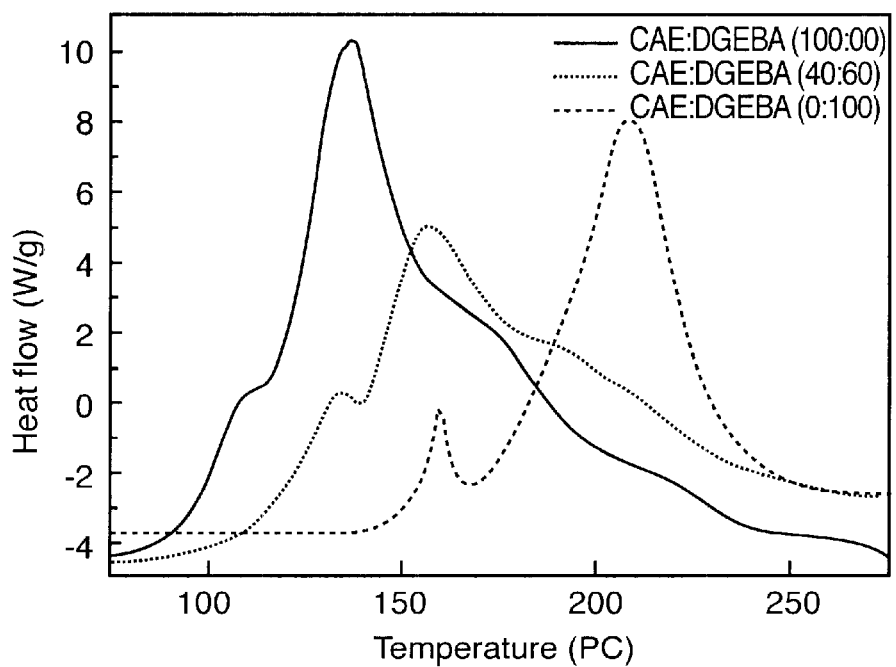
FIG. 1 illustrates a DSC thermogram demonstrating thermal behavior of novel curing systems.

The present invention provides a latent catalytic curing agent, which exhibits firstly, high performance properties and secondly, the ability to overcome the drawbacks associated with conventional epoxy curing agents, epoxy compositions containing such a curing agent, and cured products in which maximized physical properties can be observed upon the mixing of epoxy resins containing different functional groups.

Generally, it is known that the curing reaction of thermoset resins such as epoxy is extremely complex and affected by many different chemicals and reaction conditions including time, temperature and the curing agents used. When an amine, when used as a curing agent, is added to a compound containing epoxide groups, the curing reaction is known to proceed through a two-stage reaction, whereby firstly an epoxy group reacts with a primary amine as illustrated in the following reaction formula (1) and secondly whereby the resulting secondary amine reacts with an epoxy group, as illustrated in the following reaction formula (2):

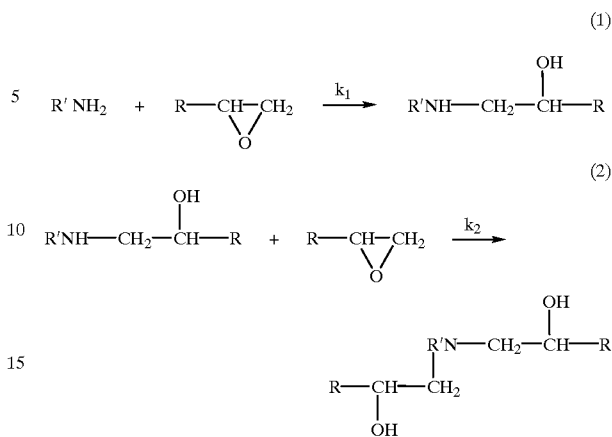

The above-mentioned amine type curing reaction is initiated by heat. Even in the case where heat is not applied externally on mixing amine type curing agent with a resin, the curing reaction proceeds within several hours, resulting in an inferior storage property of the curing agent. The structure of the cross-links formed as a result rapidly decomposes owing to the decomposition of its inner structure under oxidative atmospheric conditions at 250° C.

In reactions (1) and (2) above, R is derived from the group consisting of:

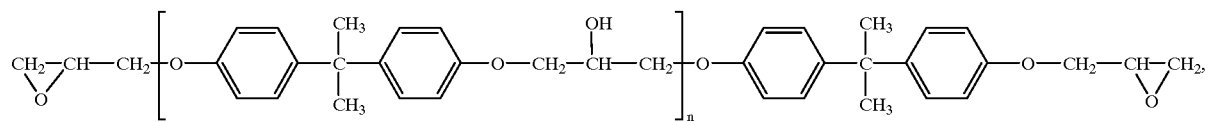

Diglycidyl Ether of Bisphenol A (DGEBA)

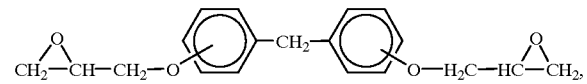

Diglycidyl Ether of Bisphenol F (DGEBF)

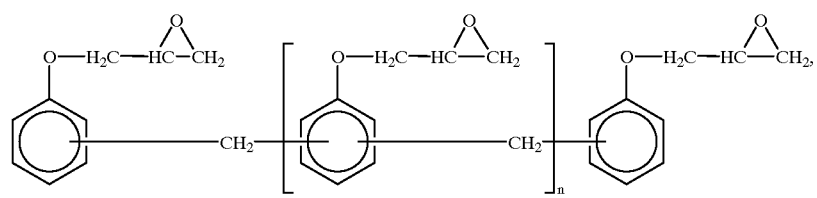

5

Polycidyl Ether of Phenol-Formaldehyde Novolac

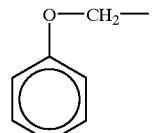

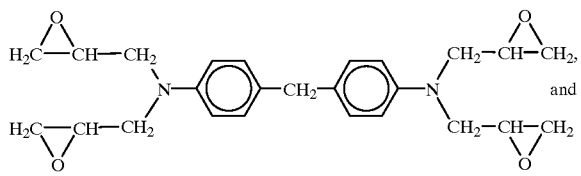

N,N,N',N'-Tetraglycidyl Methylenedianiline

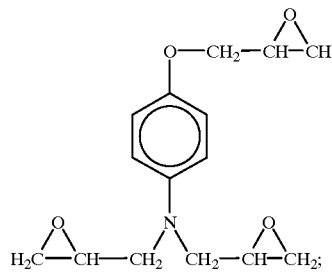

6

Triglycidyl p-Aminophenol $R^1$ is derived from the group consisting of:

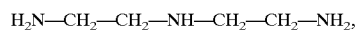$H_2N-CH_2-CH_2-NH-CH_2-CH_2-NH_2,$

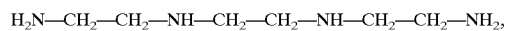$H_2N-CH_2-CH_2-NH-CH_2-CH_2-NH-CH_2-CH_2-NH_2,$

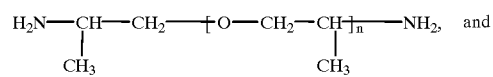

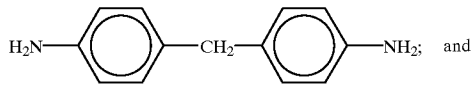

$k_1$ and $k_2$ are rate constants which may be the same or different from each other.

By way of example, but not by way of limitation, R may be selected from the group consisting of:

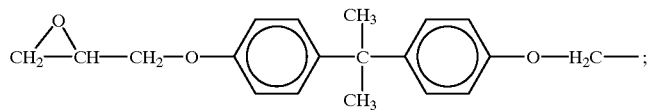

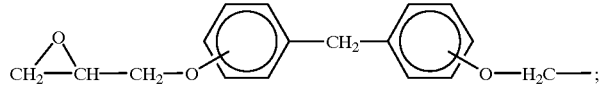

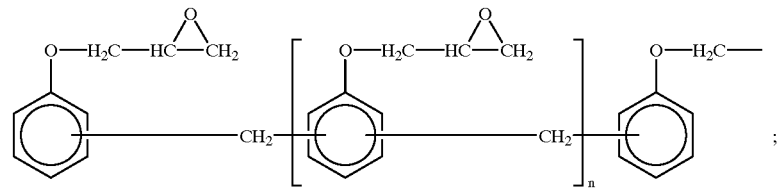

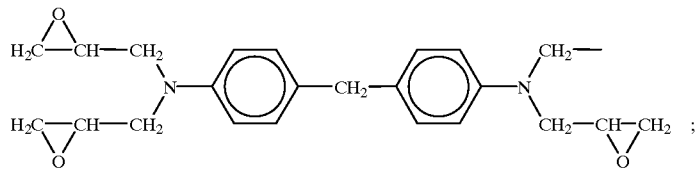

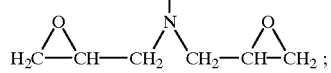

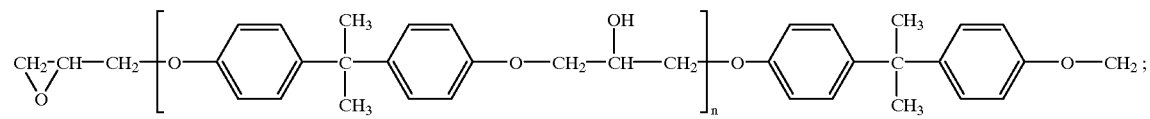

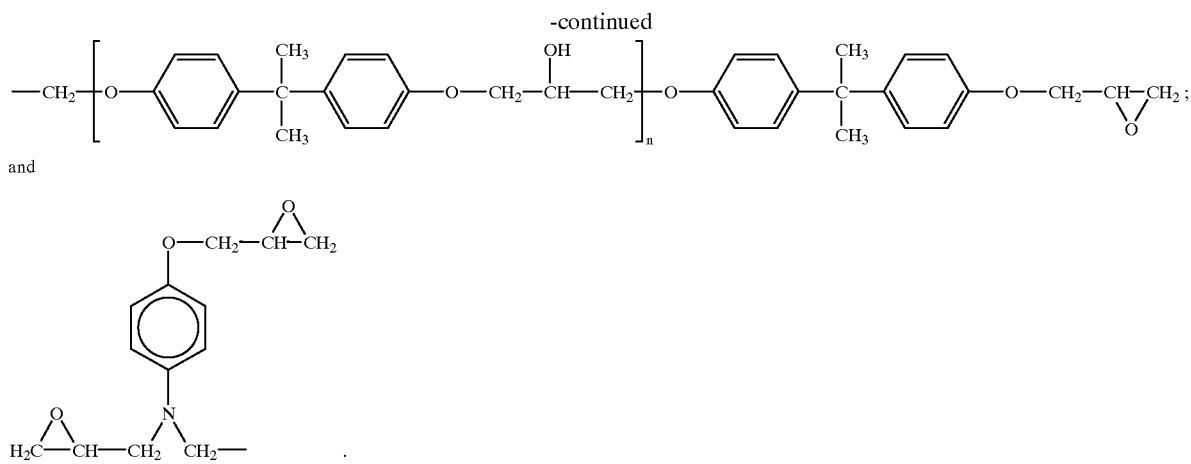

and

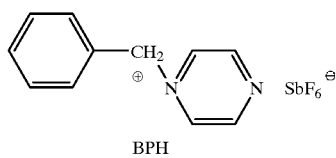

Similarly, by way of example, but not by way of limitation, $R_1$ may be selected from the group consisting of:

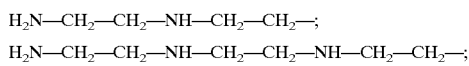
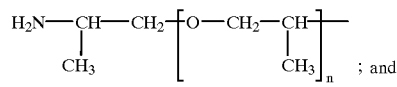
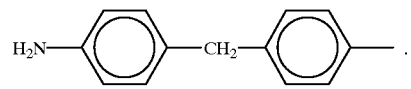

On the other hand, the curing system according to the present invention relates to a latent curing agent which does not cause the curing reaction to proceed whilst in a mixed state. The initial curing reaction only proceeds when an external energy source such as heat or light is applied. One such latent curing agent, a N-benzylpyrazinium containing hexafluoroantimonate ($SbF_6^-$) salt (hereinafter referred to as "BPH"), has been discovered to exhibit firstly an excellent degree of activity, secondly a high rate of reaction at the time of curing reaction; no inhibiting effects are observed owing to the presence of oxygen; and finally capabilities in polymerizing epoxy, lactone and acetal compounds which are not polymerized by radical polymerization, thereby obtaining polymers with other various structures. Specifically, unlike other ionic polymerization initiators, BPH is stable to polar solvents such as acetone and thus has the advantage of solvent selectivity. In addition, BPH exhibits few shrinking, toxic or harmful effects in comparison to the radical curing reaction. The chemical structure of the BPH salt is as follows:

BPH

The process for the preparation of BPH is well-known (Y.C. Kim, S. J. Park and J. R. Lee, *Polymer J*, 29, p759 (1997)) using benzyl bromide and pyridine as starting materials in the synthesis process.

When BPH is mixed with an epoxy system and the resulting mixture left at room temperature, the mixture shows storage stability of two months. If the mixture is kept in cold storage, a storage stability of approximately six months is observed. One characteristic of the curing system of the present invention in the initiation reaction is that the BPH curing agent is sensitive not only to heat, but also light such as UV-light. Generally, materials sensitive to heat also have the tendency to exhibit a diminished reactivity when exposed to light. However, in comparison, no such sensitive or diminished reactivity is observed when BPH is used in the curing systems of the present invention, where light is applied to initiate the reaction. The fundamental initiation reaction of the curing of the epoxy systems of the present invention is represented by the following reaction scheme:

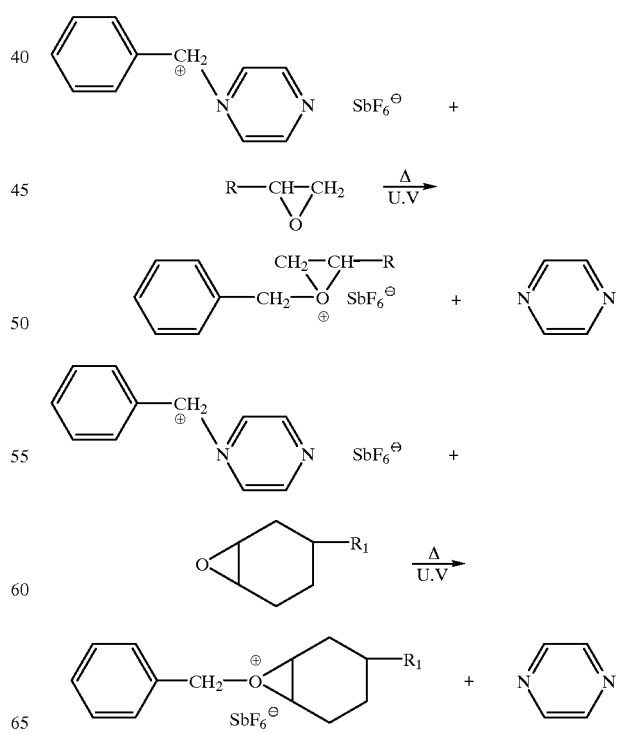

-continued

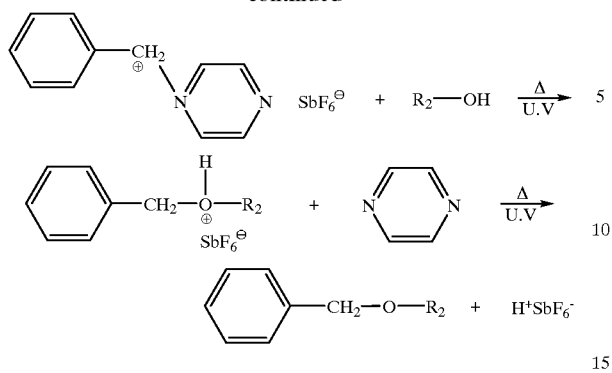

In the immediately preceding reactions, R is as defined above;

$R_1$ is

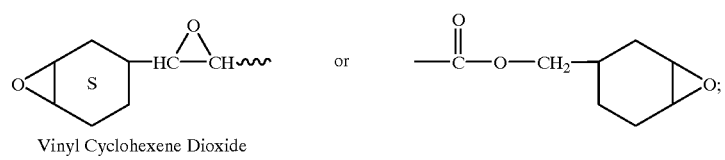

Vinyl Cyclohexene Dioxide $R_2$ is

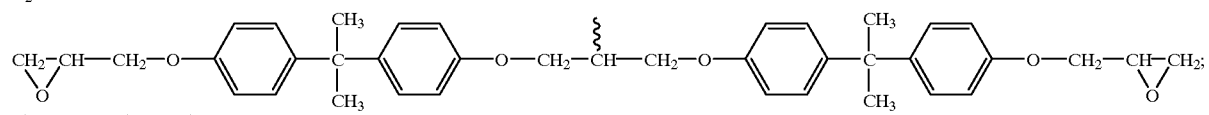

"Δ" represents heat; and
"U.V" represents ultraviolet light.

In the initiation reaction, the benzyl cation, produced by the breakage of the C—N bond in BPH by means of heat or light acts as the initiation species, which then reacts with epoxide and hydroxy groups within the epoxy resin to form activation sites. At the activation terminal, monomers continuously react to form a three-dimensional cross-linking structure.

The present invention also relates to the use of an aliphatic type epoxy (hereinafter referred to as "CAE type") and/or a difunctional bisphenol-A type epoxy (hereinafter referred to as "DGEBA type") as epoxy resins. The present inventors have now found that the physical properties of the cured products are maximized if the above-mentioned materials are used as epoxy resins.

The chemical structure of ERL 4221, an example of a CAE-type epoxy, and the structure of LY556, an example of a DGEBA-type epoxy, are demonstrated as follows:

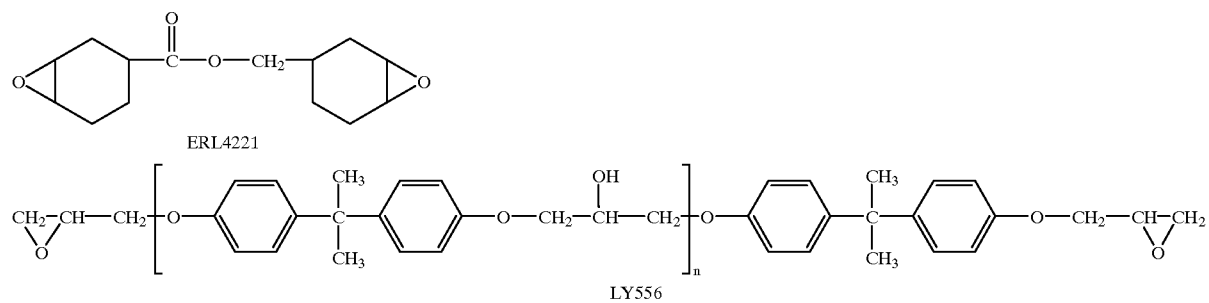

If the epoxy resin curing systems of the present invention contain only either the CAB-type epoxy or the DGEBA-type epoxy, the curing systems show significantly improved physical properties when compared to the conventional epoxy resin curing systems.

The CAE-type epoxy has a lower viscosity and a more rapid curing rate in comparison to the DGEBA-type epoxy. The DGEBA-type epoxy reacts easily with acid and anhydride, but undergoes an inferior reaction with amine, which contrasts greatly to the characteristics observed for the CAE-type epoxy. Furthermore, the CAE-type epoxy differs structurally to the DGEBA-type epoxy in that it does not contain hydroxy groups in its main chain. Accordingly, if the DGEBA-type epoxy and CAE-type epoxy are mixed, it is possible to utilize the beneficial physical properties of both materials and simultaneously compensate for their drawbacks. In particular, it has been shown that if the mixing mole ratio of the CAE-type epoxy and DGEBA-type epoxy (CAE:DGEBA) is within the range of 60:40 to 20:80, the mixture exhibits excellent physical properties including three-point flexural strength, modulus, impact strength and load-heat deformation temperature as well as complemented properties including processability and suitable reactivity.

The present invention also relates to an epoxy-cured product obtained by the curing of BPH by heat and/or light.

When BPH is cured by heat, the curing reaction is carried out by sequentially warming the temperature from 70° C. to 200° C. When the curing reaction is initiated at a temperature of not more than 70° C., a problem with great energy loss arises. When the curing reaction is initiated at a temperature of more than 200° C., the formation of cross-links may be restricted owing to the glassification or the thermal decomposition altering the structure of the cured product may occur, resulting in damage. In the implementation of such a curing procedure via sequential warming, it is possible to obtain a thermally cured product in which a high conversion is observed, since the curing removes solvents and inner pores remaining within the epoxy resins, and thus inducing the formation of a stable network structure.

Alternatively, the heat curing may be carried out by the application of heat at a temperature of between 170° C. and 200° C. without sequential warming. This is because the BPH-type-curing agent is very stable at room temperature and shows rapid activity in the temperature range of 170° C. to 200° C.

When a system is cured by light, the exterior of the system (namely, mold) in which the curing reaction occurs is constructed from a transparent material in order to allow the transmission of light, and furthermore, the distance between the source of light and the curing system is maintained between 10 cm and 20 cm. If the irradiation distance is decreased to less than 10 cm, the reaction proceeds rapidly on account of the intensity of light, whilst also resulting in the generation of heat which in turn produces unfavorable results including the formation of cracks in the cured system. Alternatively, should the irradiation distance be maintained at more than 20 cm, the response rate to the light is too slow to allow any inner curing of the system to occur, thereby resulting in a very low and, thus unfavorable conversion.

As a source of light, any light to which BPH reacts with may be utilized. In particular, UV-light is well suited to this purpose.

Since the UV-light sensitivity of resins is dependent largely upon the irradiation distance, it is preferable for the mold to be kept at a gradient of not more than 10°, and especially within 5° to 7° ranges against the horizontal plane. If the gradient of the plane is more than 10°, then the intensity of light is inversely proportional to a distance square, and the light energy can not be evenly transmitted to the samples. Therefore, it is not preferable to irradiate light at a gradient of 10° or more.

EXAMPLE

The present invention is described in more detail by referring to the following examples and comparative examples without limiting the scope of the invention in any way.

Example 1

The CAE type epoxy resin, epoxy resin ERL4221 (3,4-epoxy cyclohexyl-methyl-3',4'-epoxy-cyclohexene-carboxylate, density: 1.17 g/cm$^3$, viscosity: 409 cps) manufactured by Union Carbide Co. was used. The DGEBA type epoxy resin, LY556 (density: 1.16 g/cm$^3$, viscosity: 12000 cps) manufactured by Ciba-Geigy AG was used. The latent cationic initiator BPH was synthesized by the use of benzyl bromide and pyrazine as starting materials.

Figure 2:
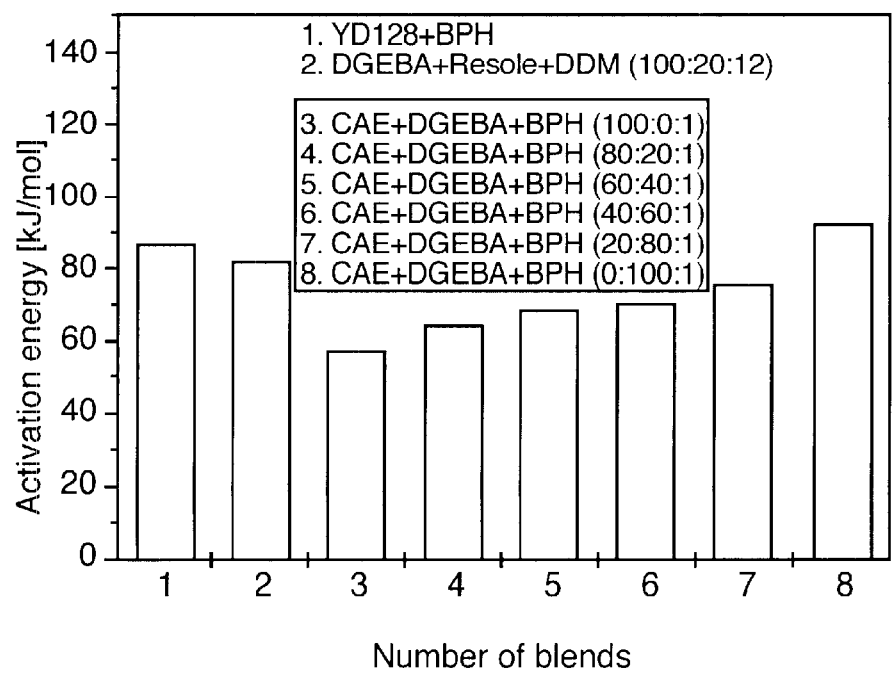
FIG. 2 illustrates comparisons between the activation energy of epoxy blends according to the present invention to those of epoxy resins using conventional curing agents, determined by isothermal DSC.

In order to determine the reaction type, miscibility and activation energy of the curing system according to the present invention, DuPont DSC910 equipped with TA2100 was adopted. The temperature was increased at a rate of 10° C./minute and the experiment was carried out at a temperature range of between 30 and 350° C. In order to minimize the unfavorable curing reaction that occurs whilst raising the temperature up to the desired isothermal curing temperature, monitored by isothermal DSC measuring, the DSC cell was preheated to the curing temperature whereupon the sample was introduced as soon as possible to determine the reaction heat. The result of dynamic DSC measurement is shown in FIG. 1 and the activation energy detected by isothermal DSC is shown in FIG. 2.

The activation energy provides very useful information in determining the optimal curing and storage conditions and also in demonstrating the curing characteristics and reactivity of the curing system. The higher the activation energy, then the more energy that required in order for the reaction to proceed is; and the reactivity decreases proportionally. As seen from the activation energy depicted in FIG. 2, the blended epoxy system with a 40:60 component ratio, according to the present invention, exhibits approximately 15 kJ/mol less activation energy, when compared to the reactions where the conventional DDM curing agent was used (82 kJ/mol) or where the same BPH curing agent was applied to the single epoxy system (87 kJ/mol). From this, it is calculated that the reactivity of the blended epoxy system according to the present invention has increased by approximately 17%.

Example 2

The latent cationic initiator is defined as the material which does not show activation under general conditions including room temperature or interior light, but can only form cationic activating species by means of the irradiation of light such as UV or heat treatment.

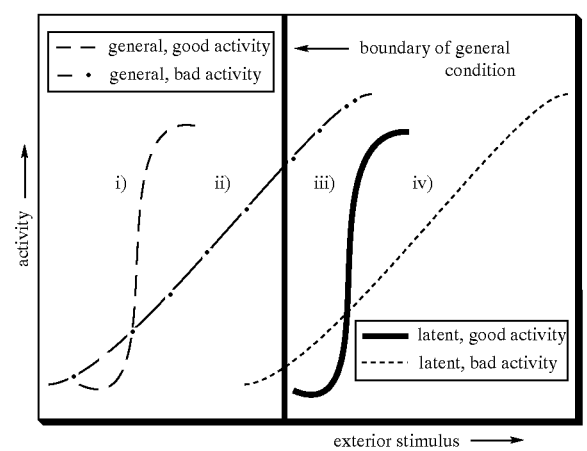

In reference to the above graphs, i) and ii) both correspond to materials that exhibit activity when starting at a condition with lower variables than general conditions. In contrast to this, iii) and iv) correspond to materials that show an activity starting at conditions with greater variables than those of general conditions, and can be identified as latent initiators. In particular, it has been determined that iii) has much better latency than iv) owing to its sharp increase in activity.

Figure 3:
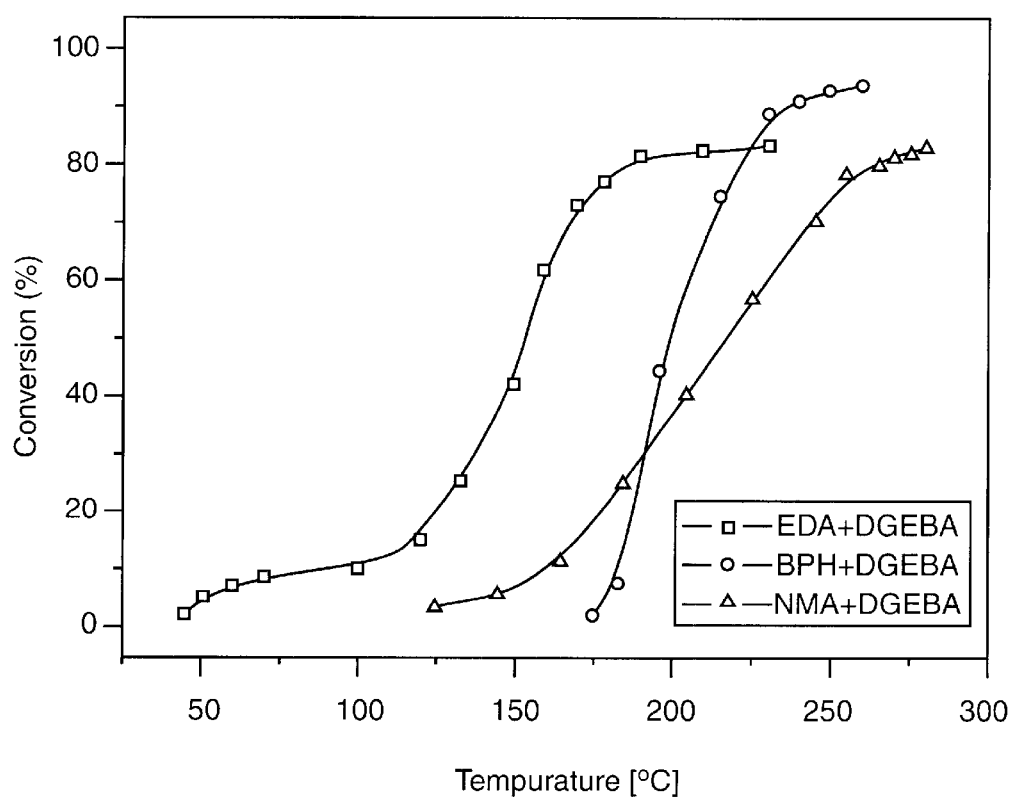
FIG. 3 illustrates the total percentage conversions according to temperature, which demonstrates the latency of the conventional amine type and acid anhydride type curing agents generally used for epoxy resins in comparison to the latent curing agent BPH.

FIG. 3 illustrates the percentage conversion according to temperature, which in turn demonstrates the latency of the conventional amine-type curing agents (ethylene diamine, EDA) in comparison to both the acid-anhydride-type curing agents (nadic methyl anhydride, NMA) and the BPH used in the curing system of the present invention. The amine type curing agents, as seen from the above graph ii), exhibit activity from a lower temperature of around 45° C. The BPH-type curing agents employed in the curing system of the present invention illustrate a high level of latency as seen from the above graph iii). In contrast to this observation, the anhydride-type curing agents illustrate behavior as can be seen in graph iv), as they begin their reaction at a higher temperature. BPH-type curing agents were also found to possess a high level of latency, with the results indicating that they were very stable at room temperature and showed a very abrupt activity in the temperature range of 170° C. to 200° C.

Example 3

Figure 4A:
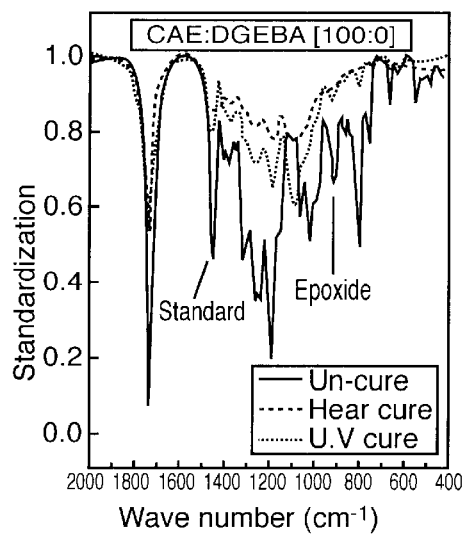
FIG. 4 illustrates variations of functional groups within epoxy resins before and after curing, determined by FT-IR.
Figure 4B:
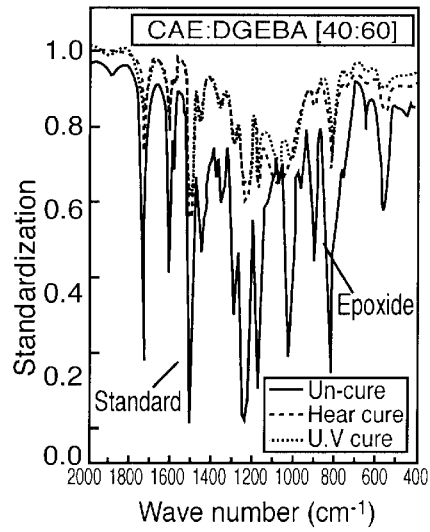
Figure 4C:
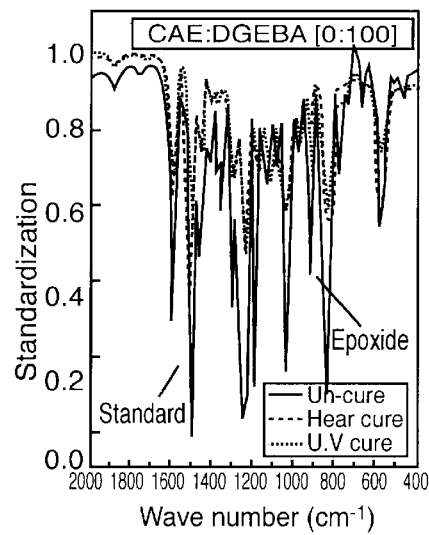
Figure 5:
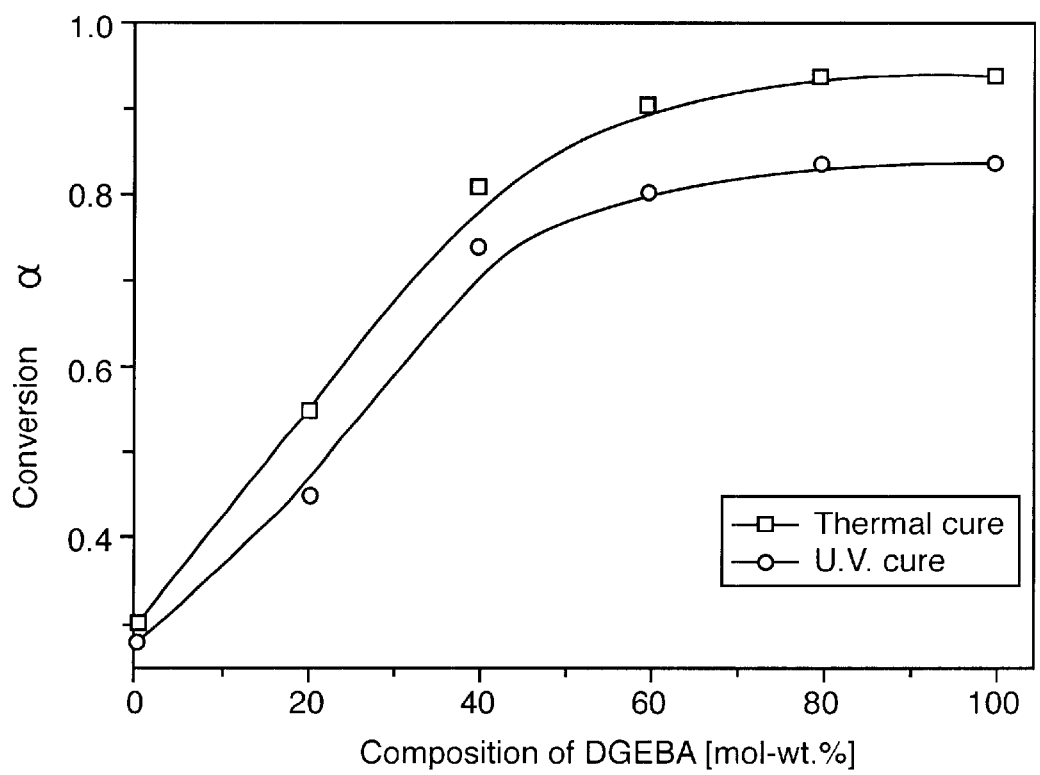
FIG. 5 illustrates the total percentage conversions of epoxides as functional groups within the epoxy resins when cured by heat and UV-light, determined by FT-IR.
Figure 6A:
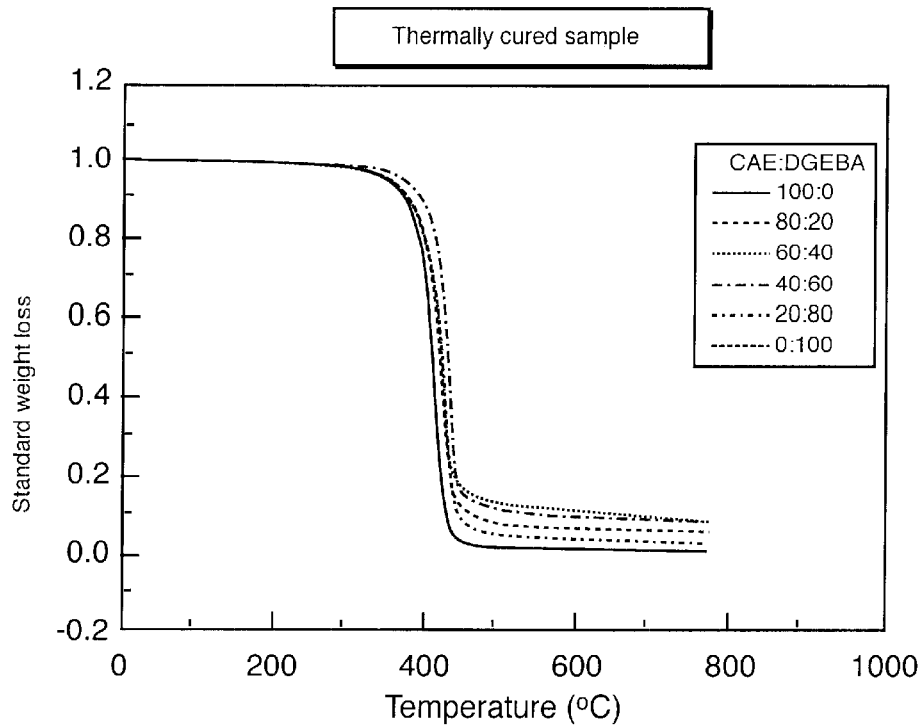
FIG. 6 illustrates TGA thermograms of cured products obtained by the addition of the latent curing agent, BPH, into epoxy blending systems and then subjection of the resulting mixtures to curing by the separate application of heat and UV-light. Such TGA thermograms demonstrate the heat resistance and heat stability of the cured products.
Figure 6B:
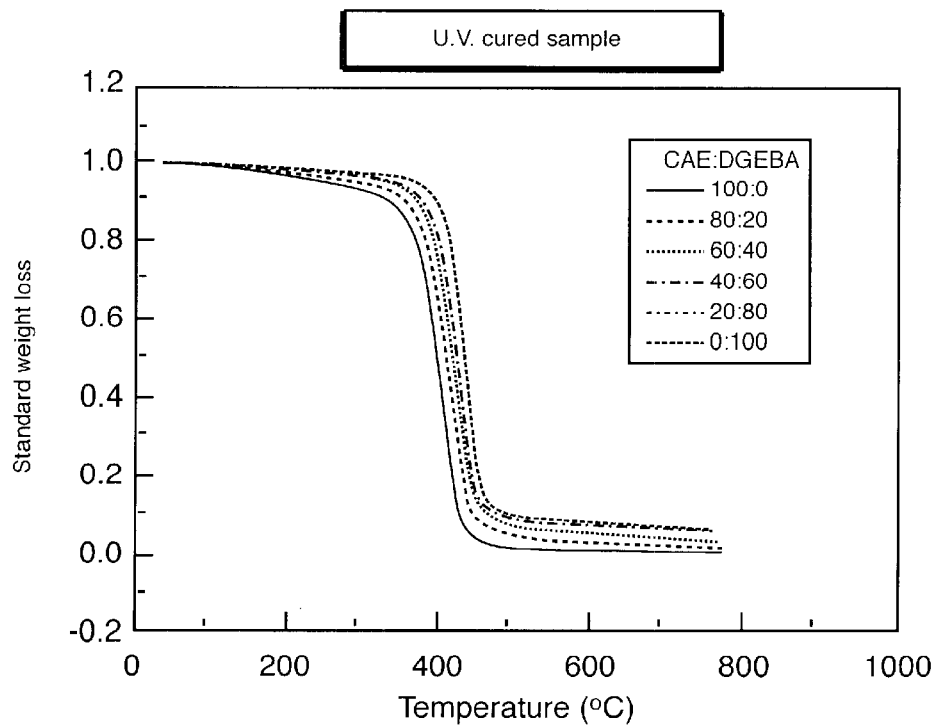

In order to determine the thermal decomposition phenomenon caused by the occurrence of the etherification process during the curing reaction of epoxy in terms of conversion of epoxides, Bio Red Win FTS 165 type FT-IR Spectroscopy was adopted and the variation of functional groups is shown in FIG. 4 by dividing uncure and thermal cure. Since the characteristic peak of epoxides, the reactive group in epoxy resins, corresponds to 913 cm$^{-1}$, it can be estimated that a large decrease in its peak means that the reactive group of the epoxide plays a large part in the cross-linking reaction to form a more compact network structure. In order to determine the curing reactivity of the samples, owing to curing by heat and light, in terms of conversion of epoxides, the conversion was calculated by inserting the peak area of the aromatic C—H peak (1510 cm$^{-1}$), a standard peak which does not participate in the reaction, and the peak area of epoxide peak into the following equation:

$$\alpha_E(t) = 1 - \frac{(A_{913}/A_{1510})_{t=t}}{(A_{913}/A_{1510})_{t=0}}$$

wherein $A_{913}$ is the peak area of the epoxide, and $A_{1510}$ is the peak area of the aromatic C—H peak. The results are compared in FIG. 5.

As a result of FT-IR determination, it was found that the peak of the epoxide was significantly decreased at the time of curing by means of heat as well as UV-light, which confirmed that the curing system of the present invention has good heat and light reactivity. Furthermore, as the content of DGEBA type epoxy increases, the amount of hydroxy groups produced in the epoxy resin also increases. Thus, there is an increased probability that the hydroxy groups will react with the epoxide, which in turn increase the rate of conversion. In addition, it was also found that BPH-type-curing agents used in the curing system of the present invention exhibited high level of activity as curing agents, and participated in the ring opening reaction of the epoxide. In view of the fact that the conversion of epoxide is around 80% when conventional curing agents are used, it was found that the epoxy system, according to the present invention, showed considerably increased activity.

Example 4

The preparation of samples thermally cured: BPH, an onium salt, forms a strong acid when irradiated and thus exhibits good efficiency of heat and light polymerization. In contrast to this, the solubility of BPH in organic materials is not high, and thus it does not dissolve well in epoxy. For this reason, it is necessary to mix BPH with a polar solvent (e.g., acetone, dioxane, tetrahydrofuran, etc.) in order to dissolve it homogeneously. 1% by mol of the solution was added to the mixed epoxy compositions (100:0, 40:60, 0:100) and the resulting mixtures thoroughly combined for approximately 30 minutes by use of a magnetic stirrer. After depressing in a vacuum oven for one hour in order to remove the foams and any remaining solvent in the resins, the resins were placed onto a steel plate of 15 cm×20 cm in size in a mold equipped with 3 mm thick silicon rubber which acted as a spacer. Then the resins were thermally cured in a convection oven at intervals of 30 minutes at 70° C., 2 hours at 140° C. and 1 hour at 200° C., respectively.

Example 5

The preparation of samples cured by light: The procedure for preparing resins was essentially the same as that of the thermally cured sample except that a glass plate having 3 mm thickness was used to form a mold in place of a steel plate, so that UV-light could be pass through. The curing proceeded by use of an ELC4000 curing system equipped with a high pressure mercury lamp of 400V, set at a strength of 100 mW/cm$^2$ and at a wave length of 365 nm. The distance between the sample and the lamp was 15 cm, and the curing was carried out at a curing period of length 3 hours directed at the front area and for 3 hours directed at the back area and at a temperature of 30° C.

Example 6

In order to examine kinetically the heat stability and decomposition reaction of the thermally cured and light cured samples as produced in Examples 4 and 5 in terms of IDT (Initial Decomposition Temperature), $T_{max}$ (Temperature at which the rate of weight loss is maximum) and IPDT (Integral Procedural Decomposition Temperature), TGA951 was chosen and the temperature of the reaction was increased at a rate of 10° C./minute from room temperature up to 800° C. (IDT represents the temperature at which hydrolysis starts, while IPDT represents the temperature which determines a quantitative thermal stability calculated on a thermogravimetric analysis and which is proposed by Doyle (see C.D. Doyle, *Anal. Chem.* 33, 77 (1961), which is incorporated herein by this reference.) The results, divided into those for the thermally cured and those for the light cured samples, can be seen in Table 1.

TABLE 1

| | CAE: DGEBA 100:0 | | CAE: DGEBA 40:60 | | CAE: DGEBA 0:100 | |
|---|---|---|---|---|---|---|
| Sample Item | Thermal cure | U.V Cure | Thermal Cure | U.V Cure | Thermal Cure | U.V Cure |
| IDT (° C.) | 290 | 150 | 317 | 192 | 353 | 216 |
| T$_{max}$ (° C.) | 420 | 412 | 446 | 436 | 450 | 438 |
| IPDT (° C.) | 428 | 414 | 512 | 484 | 589 | 518 |

On inspection of this data, it can be seen that as the amount of DGEBA, which exhibits strong heat resistance owing to the presence of aromatic rings in its structure, was increased, then the heat stability of the samples became greater. It was shown that the samples with an increased content of DGEBA exhibited increased heat stability when compared to the samples containing only CAE, for example, the thermally cured products exhibited an increase of 58% in heat stability, whilst the light cured products exhibited an increase of 56% in heat stability.

The activation energy of decomposition can be calculated using this beneficial information on thermal decomposition by the following Horowitz & Metzger's integral formula:

$$\ln[\ln(1-\alpha)^{-1}] = \frac{E_t \theta}{RT_s^2}$$

Where $\alpha$ is the decomposition fraction, $E_t$ is the activation energy for decomposition, $T_s$ is the temperature at which the decomposition rate is maximum, $\theta = T - T_s$ and R is the gas constant (R=8.314 J/(mol·K)).

Figure 7:
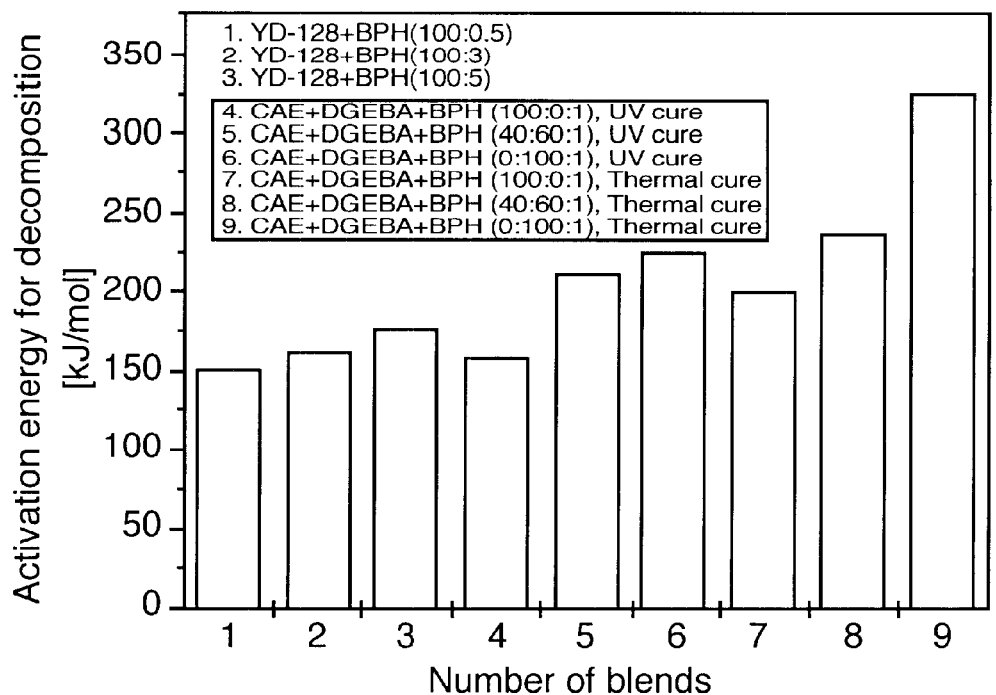
FIG. 7 illustrates the activation energy for the decomposition of the conventional single epoxy systems using BPH curing agent in comparison to that of the new blended epoxy systems, according to the present invention, using the BPH curing agent, determined by TGA.

The activation energy for the decomposition of the epoxy system according to the present invention was calculated using the above formula. The results were compared to those of the single epoxy system and shown in FIG. 7. The activation energy for decomposition can be defined as the energy required for the decomposition of intermolecular bonds in polymer materials consisting of three-dimensional cross-linking structure by an exterior energy such as heat. It can, therefore, be determined that the higher the activation energy is for decomposition, the better the heat stability is. Accordingly, from the results shown in FIG. 7, it was found that the blended epoxy system, illustrated by the example system consisting of CAE:DGEBA with a component ratio of 40:60 showed an increased activation energy for decomposition, namely heat stability, by approximately 30%, in comparison to the single epoxy system.

Example 7

Figure 8:
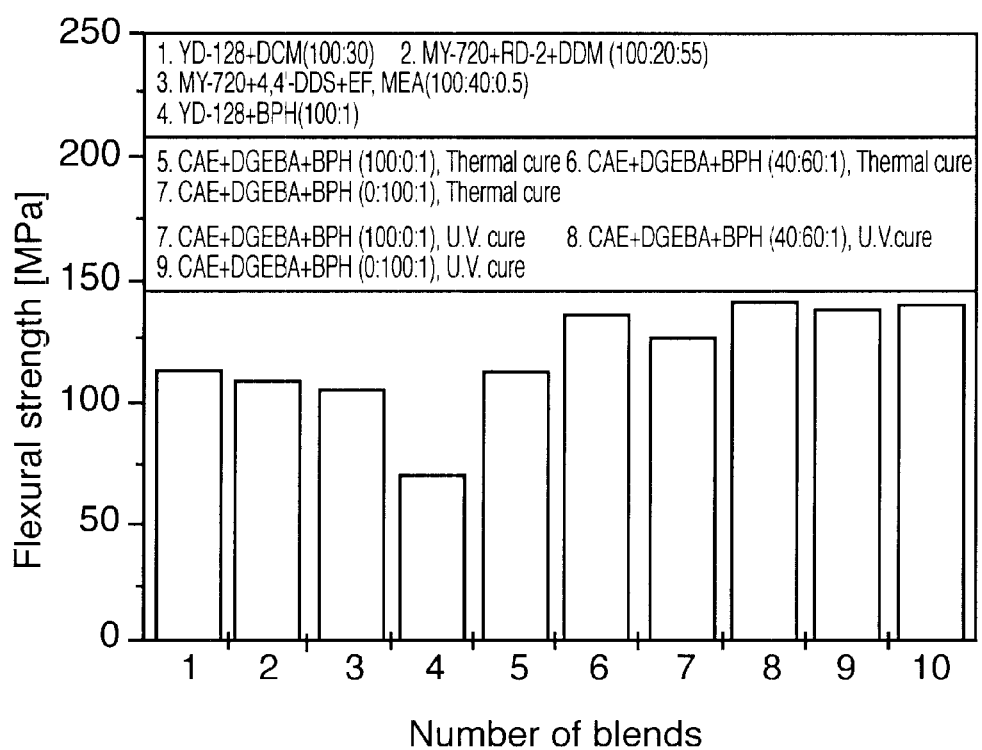
FIG. 8 illustrates the flexural strength of cured products, cured by the use of conventional curing agents, in comparison to that of the cured products which have been obtained by the addition of the latent curing agent, BPH, to blended epoxy systems, utilizing heat and UV-light separately to cure them.
Figure 9:
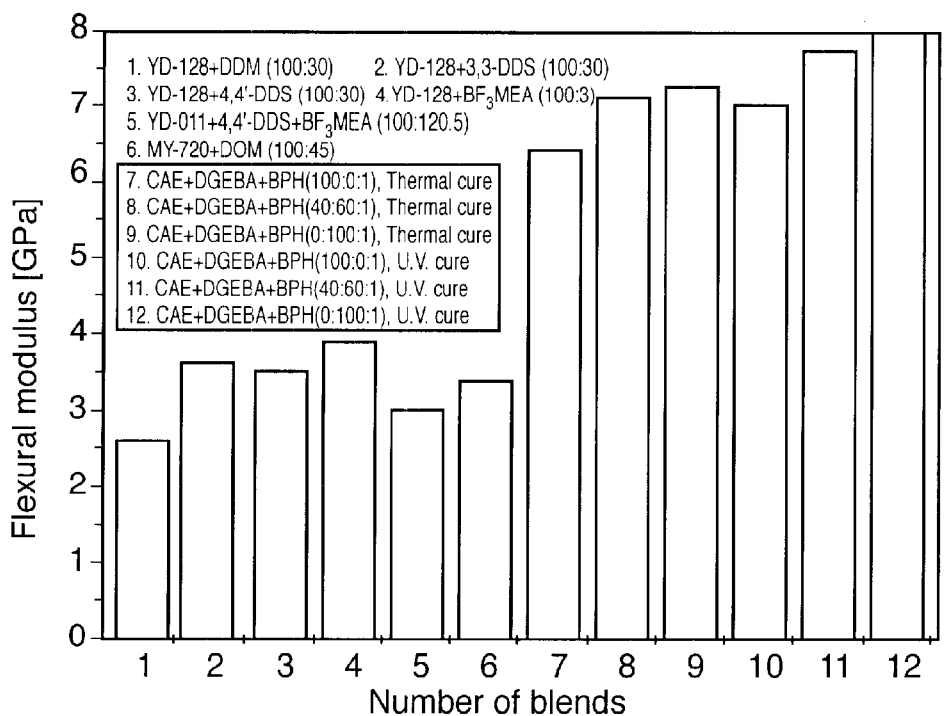
FIG. 9 illustrates the flexural modulus of the cured products, cured by the use of conventional curing agents, in comparison to that of the cured products which have been obtained by the addition of the latent curing agent, BPH, to blended epoxy systems, utilizing heat and UV-light separately to cure them.

Five samples were prepared for each different composition from the samples produced in Examples 4 and 5 and were then subjected to a three-point bending test, carried out by the use of Instron 1125 in accordance with ASTM D790. The span length between sample thickness and support was fixed at 1:16 and the cross-head speed was 2 mm/minute. The results are shown in FIGS. 8 and 9.

From the above results, it was found that the maximum increase of the three-point flexural strength was 15% in comparison to the conventional curing system, and no less than a 100% increase when compared to the single epoxy system in which the same BPH curing agent was used. Furthermore, the three-point flexural modulus also showed a maximum increase of 125% in comparison to the conventional curing system. The three-point flexural strength and the three-point flexural modulus of the heat-or light-cured products of the present blending systems for each composition are summarized in Table 2.

Example 8

Figure 10:
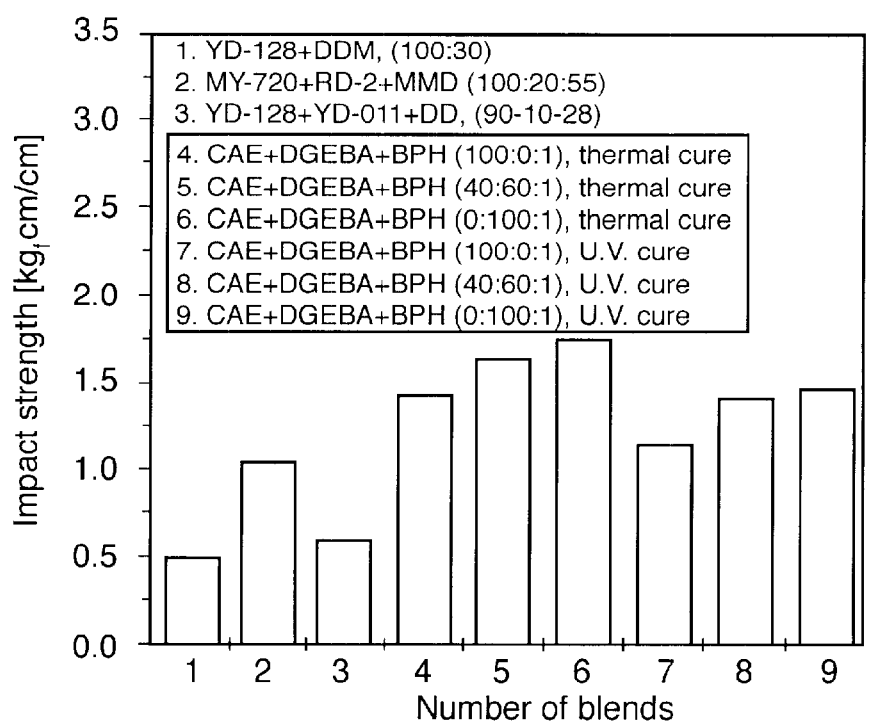
FIG. 10 illustrates the impact strength of the cured products, cured by the use of conventional curing agents, in comparison to the cured products obtained by the addition of the latent curing agent, BPH, to blended epoxy systems, utilizing heat and UV-light separately to cure them.

The Izod impact test was carried out by the use of a Tinius Olsel Model 66 Izod impact tester in accordance with ASTM D256. In the test, samples made up of the conventional curing agents and of the latent-curing agent blended with the present epoxy blending systems were used. The physical properties observed are shown in FIG. 10.

The impact strength can be defined as the instantaneous force applied at the time of breakage to a subject. This energy is determined by how much weight is absorbed in a unit of kg·cm. If a subject receives a large enough force in a short enough time, the impact resistance of that subject may be improved, only if the polymer groups constituting the subject change their molecular arrangement by the applied force, and deform the molecule's existing format. As seen from the results in FIG. 9, the epoxy systems of the present invention showed an increased impact resistance of 80% in comparison to the conventional curing system, which already had a comparatively good impact resistance. The impact resistance of the heat/light-cured products of the present blended systems for each composition is summarized in Table 2.

Example 9

Figure 11:
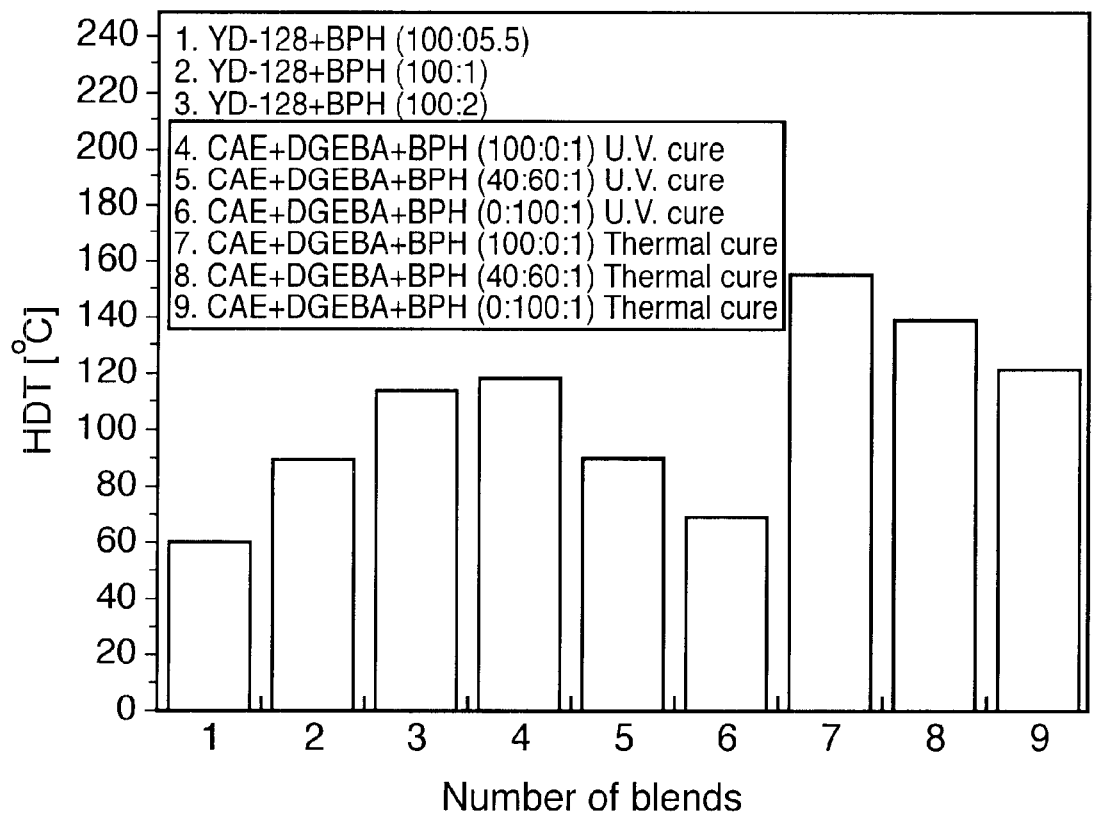
FIG. 11 illustrates the load-heat deflection temperature of the samples when manufactured from the single epoxy systems using the same latent curing agent, BPH, as a curing agent in comparison to that of the curing systems according to the present invention wherein different epoxy resins are blended.

In order to determine the physical properties of the light-and heat-cured samples under high-temperature conditions, the Load-Heat Deflection Temperature test was carried out by the use of a Tinus Olsel Model under a load of 18.6 $kg_f$ (i.e., 18.6 kilograms of force) in accordance with ASTM D648-82. When the latent curing agent BPH is applied to a single epoxy system and to a blended curing system in which two epoxy resins are blended, the resulting physical properties are compared and are shown in FIG. 11.

The Load-heat deflection test is the test employed in the determination of the physical properties of samples under high-temperature conditions which comprises raising the temperature of the electrothermal medium at a constant rate whilst applying the defined flexural stress to test specimens in a heating bath, and then measuring the temperature when the test specimen reaches the defined deflection amount. The load-heat deflection showed a high value as the content of CAE was increased. The physical properties of the blended epoxy system according to the present invention showed a maximum of 150% higher load-heat deflection temperature in comparison to the single epoxy resin. The HDT values of the light/heat-cured products of the present blended system for each composition are summarized in Table 2.

The three-point flexural strength, modulus and impact strength of the blended systems consisting of only CAE (CAE: DGEBA 100:0) diminished by a maximum of approximately 90% in comparison to those of the blended systems consisting of only DGEBA. In contrast, the load-heat deflection temperature of the blended systems consisting of only CAE (CAE: DGEBA 100:0) exhibited an increase of approximately 26% in comparison to that of the blended systems consisting of only DGEBA. In terms of the reaction rate, which acts as an important factor at the time of processing, CAE showed a better reactivity which increased by approximately 60% more than DGEBA. In contrast, the systems consisting of only DGEBA exhibited improved general physical properties, but a deteriorated load-heat deflection temperature. Therefore, the systems consisting of only DGEBA are not preferable as materials for use at high temperature. In addition, the systems consisting of only DGEBA have significantly diminished reactivity and processability in comparison to the systems consisting of only CAE owing to their high viscosity and the existence of aromatic groups. Accordingly, the blended systems according to the present invention with a CAE-:DGEBA component ratio of 60:40 to 20:80 are preferable to those systems with a CAE:DGEBA component ratio of 100:0, 80:20 and 0:100 in view of their reactivity, processability and suitable physical properties,

TABLE 2

| Sample Item | CAE: DGEBA 100:0 | | CAE: DGEBA 80:20 | | CAE: DGEBA 60:40 | |
|---|---|---|---|---|---|---|
| | Thermal cure | U.V Cure | Thermal Cure | U.V Cure | Thermal Cure | U.V Cure |
| Flexural strength [MPa] | 70 | 125 | 79 | 127 | 120 | 138 |
| Flexural modulus [GPa] | 6.51 | 7.13 | 6.62 | 7.22 | 7.18 | 7.77 |
| Impact strength [kg$_f$cm/cm] | 1.45 | 1.12 | 1.46 | 1.20 | 1.62 | 1.41 |
| HDT [° C.] | 158 | 120 | 155 | 118 | 150 | 115 |
| Flexural strength [MPa] | 129 | 140 | 130 | 141 | 136 | 142 |
| Flexural modulus [GPa] | 7.28 | 7.83 | 7.31 | 7.85 | 7.42 | 8 |
| Impact strength [kg$_f$cm/cm] | 1.68 | 1.43 | 1.72 | 1.48 | 1.8 | 1.5 |
| HDT [° C.] | 145 | 108 | 138 | 95 | 125 | 70 |

In Table 2 above, "MPa" and "GPa" are megapascals and gigapascals, respectively.

The invention is a latent curing agent comprising BPH for curing an epoxy resin by heat, UV light, or both heat and UV light. The invention also includes a composition comprising BPH and an acceptable curing-agent carrier. The curing-agent carrier optionally may be selected from the group consisting of ethylene diamine, 4,4'-diaminodiphenylenemethane, tetrahydrophthalic anhydride, and the like. For example, the curing-agent carrier may be an amine, an organic compound, and/or an inorganic compound.

In addition, the invention includes an epoxy-resin composition comprising BPH as a latent curing agent and optionally farther comprising a resin, such as an epoxy resin. The epoxy-resin composition may, for example, comprise a functional epoxy resin such as difunctional epoxy resin, a trifunctional epoxy resin, and/or a tetraflnctional epoxy resin; and the epoxy-resin composition optionally further comprises a phenol and/or a polyester, wherein the phenol optionally may be a non-phase-separated phenol and the polyester optionally may be a non-phase-separated polyester. The epoxy resin also may optionally be a CAP-type epoxy resin and/or a DGEBA-type epoxy resin. A general chemical formula for a CAE-type epoxy resin is R—CHCH$_2$(CH)$_2$O(CH$_2$)$_2$, wherein R may be, for example, CH$_2$CO$_2$CHCH$_2$CHOCH(CH$_2$)$_2$ or may be derived therefrom; and a general chemical formula for a DGEBA-type epoxy resin is R—CHCH$_2$O, wherein R may be, for example, CH$_2$CHOCH$_2$[OC$_6$H$_6$C(CH$_3$)$_2$OCH$_2$CHOH CH$_2$]$_n$OC$_6$H$_6$C(CH$_3$)$_2$C$_6$H$_6$OCH$_2$ or may be derived therefrom.

The invention also includes a method for preparing a cured resin product, the method comprising mixing BPH with an epoxy resin (as described above) to form an epoxy-resin mixture, and curing the epoxy-resin mixture by heat, UV light, or both heat and UV light. More specifically, the method comprises mixing BPH with a solvent (such as a polar solvent) to dissolve the BPH to form a BPH solution. Then, the BPH solution (approximately 0.1–10% by mol, or approximately 0.5–5% by mol, or about 1–3% by mol, or about 1% by mol) is mixed with the epoxy resin, which may comprise one or more epoxy resins, to form the epoxy-resin mixture. Optionally, the epoxy-resin mixture is depressed in a vacuum or a vacuum oven in order to remove foam and/or remaining solvent(s) from the epoxy-resin mixture. Then, the epoxy-resin mixture is thermally cured by heat, UV light, or both heat and UV light. The amount of BPH that is mixed with the epoxy resin is sufficient to cure the epoxy resin by heat, UV light, or both heat and UV light.

The UV light may be provided by a lamp (e.g., a high-pressure mercury lamp, a mercury lamp, a high-pressure lamp, or any other suitable lamp) having a suitable voltage (e.g., a voltage of approximately 400 V, or about 100–700 V, or about 200–600 V, or about 300–500 V, or about 350–450 V, or any other suitable voltage); a suitable strength (e.g., a strength of about 100 mW/cm$^2$, or about 1 1000 mW/cm$^2$, or about 5–500 mW/cm$^2$, or about 10–400 mW/cm$^2$, or about 25–300 mW/cm$^2$, or about 50–200 mW/cm$^2$, or about 60–150 mW/cm$^2$, or about 75–125 mW/cm$^2$, or any other suitable strength); and a suitable wavelength (e.g., a wavelength approximately equal to the wavelength of ultraviolet light, or a wavelength of about 365 nm, or less than or equal to about 400 nm, or about 4–400 nm, or about 40–400 nm, or any other suitable wavelength). The curing with UV light may be carried out for any suitable length of time (e.g., about 0.5–20 hours, about 1–15 hours, about 2–10 hours, about 3–8 hours, about 4–6 hours, or any other suitable length of time). The distance between the sample (i.e., the epoxy-resin mixture) being cured and the lamp may be any suitable distance (e.g., about 15 cm, about 1–1000 cm, about 2–500 cm, about 5–250 cm, about 7–100 cm, about 10–50 cm, or any other suitable distance).

The curing with heat may be carried out for any suitable length of time (e.g., about 5 minutes–20 hours, about 10 minutes–15 hours, about 0.5–10 hours, about 0.75–8 hours, about 1–6 hours, about 2–5 hours, about 3–4 hours, or any other suitable length of time). The temperature of the sample being cured by heat may be increased gradually up to about 180–220° C. at a suitable rate of increase (e.g., a rate of approximately 0.5–10° C./minute, about 1–8° C./minute, about 2–7° C./minute, about 3–7° C./minute, about 4–6° C./minute, about 3–5° C./minute, or any other suitable rate of increase).

All of the numerical and quantitative measurements set forth in this application (including in the examples and in the claims) are approximations. For example, when the application refers to a time range from 30 minutes to 120 minutes, the time range is actually from approximately 30 minutes to approximately 120 minutes. The preceding sentence sets forth a non-limiting example because, as stated in the first sentence of this paragraph, all of the numerical and quantitative measurements set forth in this application (including in the examples and in the claims) are approximations.

Effects of Invention

The heat- and light-cured products prepared by the use of the latent curing agent, BPH, and blended epoxy systems according to the present invention exhibited excellent physical properties not only such as three-point flexural strength, modulus, impact strength and load-heat deflection temperature but also excellent storage stability and heat stability.

What is claimed is:

1. An epoxy resin cured product, wherein the product is produced by curing by ultra-violet light a composition comprising an epoxy resin and an N-benzylpyrazinium hexafluoroantimonate.

2. An epoxy resin cured product as claimed in claim 1, wherein the curing is carried out in a curing system having an exterior constructed from a transparent material in order to allow transmission of the ultraviolet light; wherein the ultraviolet light is produced by a source; wherein there is a distance between the source and the curing system; wherein the distance is maintained between about 10 cm and about 20 cm; and wherein the exterior of the curing system is kept at a gradient within a range of about 5° to about 7° to a horizontal plane.

3. A method for producing an epoxy resin cured product as claimed in claim 1, wherein the method comprises curing the composition comprising the epoxy resin and the N-benzylpyrazinium hexafluoroantimonate by using ultra-violet light.

4. A method as claimed in claim 3, wherein the curing is carried out in a curing system having an exterior constructed from a transparent material in order to allow transmission of the ultra-violet light; wherein the ultraviolet light is produced by a source; wherein there is a distance between the source and the curing system; wherein the distance is maintained between about 10 cm and about 20 cm; and wherein the exterior of the curing system is kept at a gradient within a range of about 5° to about 70 to a horizontal plane.

5. An epoxy resin cured product as claimed in claim 1, wherein the epoxy resin comprises an aliphatic epoxy, a diglycidylether of bisphenol A, or a mixture of the aliphatic epoxy and the diglycidylether of bisphenol A.

6. An epoxy resin cured product wherein the epoxy resin comprises the mixture, wherein the mixture has a ratio (% by mol.) of the aliphatic epoxy to the diglycidylether of bisphenol A, wherein the ratio is about 60:40 to about 20:80.

7. An epoxy resin cured product as claimed in claim 5, wherein the epoxy resin comprises the mixture, wherein the mixture has a ratio (% by mol.) of the aliphatic epoxy to the diglycidylether of bisphenol A, wherein the ratio is about 20~60:40~80.

8. A method for producing an epoxy resin cured product as claimed in claim 5, wherein the method comprises curing the composition comprising the epoxy resin and the N-benzylpyrazinium hexafluoroantimonate by using ultra-violet light, wherein the epoxy resin comprises the aliphatic epoxy, the diglycidylether of bisphenol A, or the mixture of the aliphatic epoxy and the diglycidylether of bisphenol A.

9. A method as claimed in claim 8, wherein the epoxy resin comprises the mixture, wherein the mixture has a ratio (% by mol.) of the aliphatic epoxy to the diglycidylether of bisphenol A, wherein the ratio is about 60:40 to about 20:80.

10. A method as claimed in claim 8, wherein the epoxy resin comprises the mixture, wherein the mixture has a ratio (% by mol.) of the aliphatic epoxy to the diglycidylether of bisphenol A, wherein the ratio is about 20~60:40~80.

11. An epoxy resin cured product as claimed in claim 5, wherein the aliphatic epoxy is a cycloaliphatic epoxy.

12. An epoxy resin cured product as claimed in claim 5, wherein the aliphatic epoxy is 3,4-epoxy cyclohexyl-methyl-3',4'-epoxy-cyclohexenecarboxylate.

13. An epoxy resin cured product as claimed in claim 5, wherein the aliphatic epoxy is:

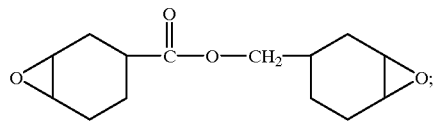

and wherein the diglycidylether of bisphenol A is:

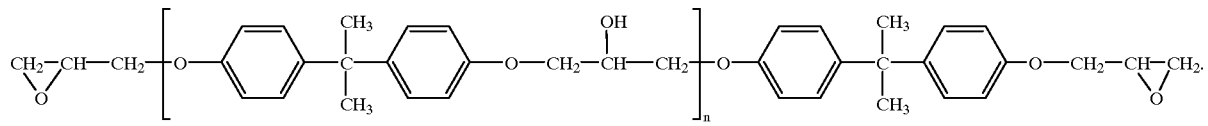

14. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroanti-monate by using heat or by using both heat and ultraviolet light, wherein the curing is carried out by sequentially increasing the temperature from about 70° C. to about 200° C., and wherein increasing the temperature from about 70° C. to about 120° C. occurs at a rate of approximately 3° C./minute and increasing the temperature from about 120° C. to about 200° C. occurs at a rate of approximately 5° C./minute.

15. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroanti-monate by using heat or by using both heat and ultraviolet light, wherein the curing is carried out by sequentially increasing the temperature from about 170° C. to about 200° C., and wherein increasing the temperature from about 170° C. to about 200° C. occurs at a rate of approximately 5° C./minute.

16. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroanti-monate by using heat or by using both heat and ultraviolet light, and wherein the curing is carried out by increasing the temperature from about 60–80° C. to about 180–220° C.

17. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroanti-monate by using heat or by using both heat and ultraviolet light, and wherein the curing is carried out by increasing the temperature from about 150–190° C. to about 180–220° C.

18. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroantimonate by using heat or by using both heat and ultraviolet light, wherein the curing is carried out by sequentially increasing the temperature from about 60–80° C. to about 180–220° C., and wherein increasing the temperature from about 60–80° C. to about 120° C. occurs at a rate of approximately 3° C./minute and increasing the temperature from about 120° C. to about 180–220° C. occurs at a rate of approximately 5° C./minute.

19. A method for producing an epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the method comprises curing the composition comprising the epoxy resin and the N-benzylpyrazinium hexafluoroantimonate by using heat or by using both heat and ultraviolet light, wherein the curing is carried out by sequentially increasing the temperature from about 150–190° C. to about 180–220° C., and wherein increasing the temperature from about 150–190° C. to about 180–220° C. occurs at a rate of approximately 5° C./minute.

20. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the curing is carried out by sequentially increasing the temperature from about 70° C. to about 200° C., wherein increasing the temperature from about 70° C. to about 120° C. occurs at a rate of approximately 3° C./minute and increasing the temperature from about 120° C. to about 200° C. occurs at a rate of approximately 5° C./minute; and wherein the epoxy resin comprises an aliphatic epoxy, a diglycidylether of bisphenol A, or a mixture of the aliphatic epoxy and the diglycidylether of bisphenol A.

21. An epoxy resin cured product as claimed in claim 20, wherein the epoxy resin comprises the mixture, wherein the mixture has a ratio (% by mol.) of the aliphatic epoxy to the diglycidylether of bisphenol A, wherein the ratio is about 60:40 to about 20:80.

22. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the curing is carried out by sequentially increasing the temperature from about 170° C. to about 200° C., wherein increasing the temperature from about 170° C. to about 200° C. occurs at a rate of approximately 5° C./minute; and wherein the epoxy resin comprises an aliphatic epoxy, a diglycidylether of bisphenol A, or a mixture of the aliphatic epoxy and the diglycidylether of bisphenol A.

23. An epoxy resin cured product as claimed in claim 22, wherein the epoxy resin comprises the mixture, wherein the mixture has a ratio (% by mol.) of the aliphatic epoxy to the diglycidylether of bisphenol A, wherein the ratio is about 60:40 to about 20:80.

24. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the curing is carried out by increasing the temperature from about 60–80° C. to about 180–220° C.; and wherein the epoxy resin comprises an aliphatic epoxy, a diglycidylether of bisphenol A, or a mixture of the aliphatic epoxy and the diglycidylether of bisphenol A.

25. An epoxy resin cured product as claimed in claim 24, wherein the epoxy resin comprises the mixture, wherein the mixture has a ratio (% by mol.) of the aliphatic epoxy to the diglycidylether of bisphenol A, wherein the ratio is about 60:40 to about 20:80.

26. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein-the curing is carried out by increasing the temperature from about 150–190° C. to about 180–220° C.; and wherein the epoxy resin comprises an aliphatic epoxy, a diglycidylether of bisphenol A, or a mixture of the aliphatic epoxy and the diglycidylether of bisphenol A.

27. An epoxy resin cured product as claimed in claim 26, wherein the epoxy resin comprises the mixture, wherein the mixture has a ratio (% by mol.) of the aliphatic epoxy to the diglycidylether of bisphenol A, wherein the ratio is about 60:40 to about 20:80.

28. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the curing is carried out by sequentially increasing the temperature from about 60–80° C. to about 180–2200° C., wherein increasing the temperature from about 60–80° C. to about 120° C. occurs at a rate of approximately 3° C./minute and increasing the temperature from about 120° C. to about 180–220° C. occurs at a rate of approximately 5° C./minute; and wherein the epoxy resin comprises an aliphatic epoxy, a diglycidylether of bisphenol A, or a mixture of the aliphatic epoxy and the diglycidylether of bisphenol A.

29. An epoxy resin cured product as claimed in claim 28, wherein the epoxy resin comprises the mixture, wherein the mixture has a ratio (% by mol.) of the aliphatic epoxy to the diglycidylether of bisphenol A, wherein the ratio is about 60:40 to about 20:80.

30. An epoxy resin cured product, wherein the product is produced by curing by heat or by both heat and ultraviolet light a composition comprising an epoxy resin and an N-benzylpyrazinium hexafluoroantimonate, wherein the composition has a temperature, wherein the curing is carried out by sequentially increasing the temperature from about 150–190° C. to about 180–220° C., wherein increasing the temperature from about 150–190° C. to about 180–220° C. occurs at a rate of approximately 5° C./minute; and wherein the epoxy resin comprises an aliphatic epoxy, a diglycidylether of bisphenol A, or a mixture of the aliphatic epoxy and the diglycidylether of bisphenol A.

31. An epoxy resin cured product as claimed in claim 30, wherein the epoxy resin comprises the mixture, wherein the mixture has a ratio (% by mol.) of the aliphatic epoxy to the diglycidylether of bisphenol A, wherein the ratio is about 60:40 to about 20:80.

* * * * *